U. S. MORRIS.
PIPE BENDING MECHANISM.
APPLICATION FILED NOV. 12, 1917. RENEWED NOV. 12, 1919.

1,342,564.

Patented June 8, 1920.
3 SHEETS—SHEET 1.

INVENTOR
Urban Shaler Morris
By W. F. Davis & Son
ATTORNEY

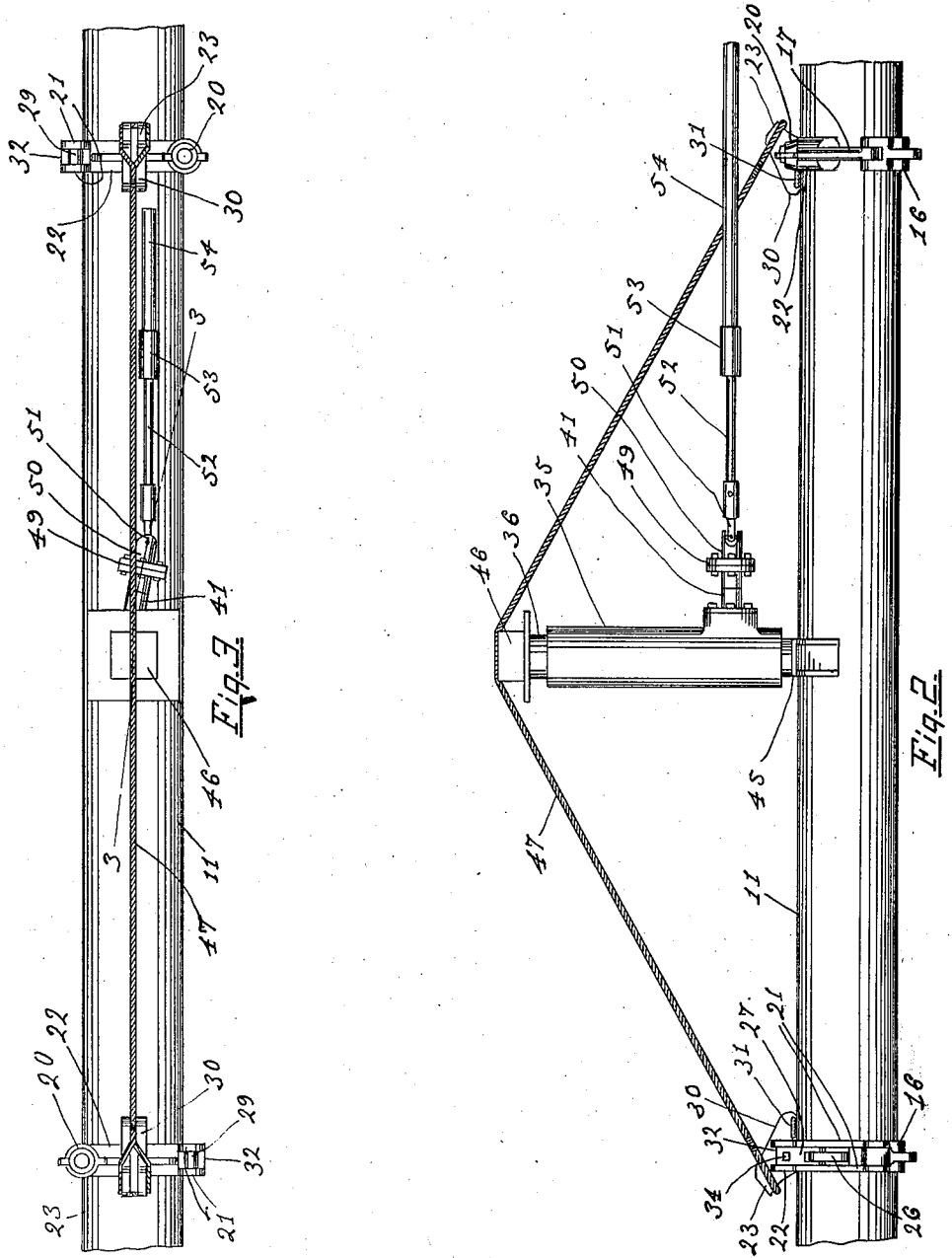

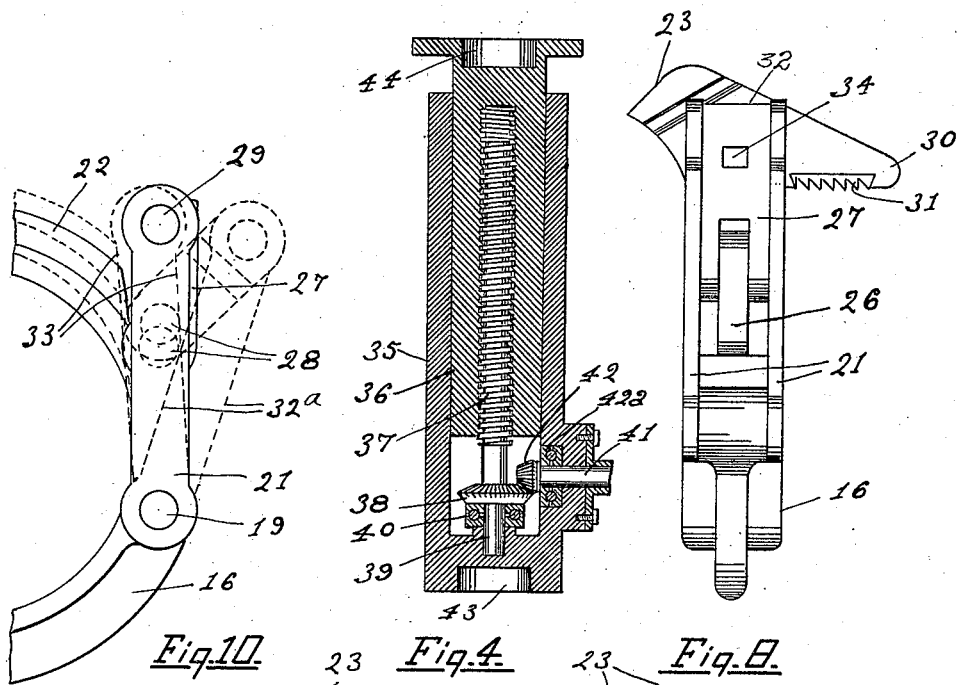
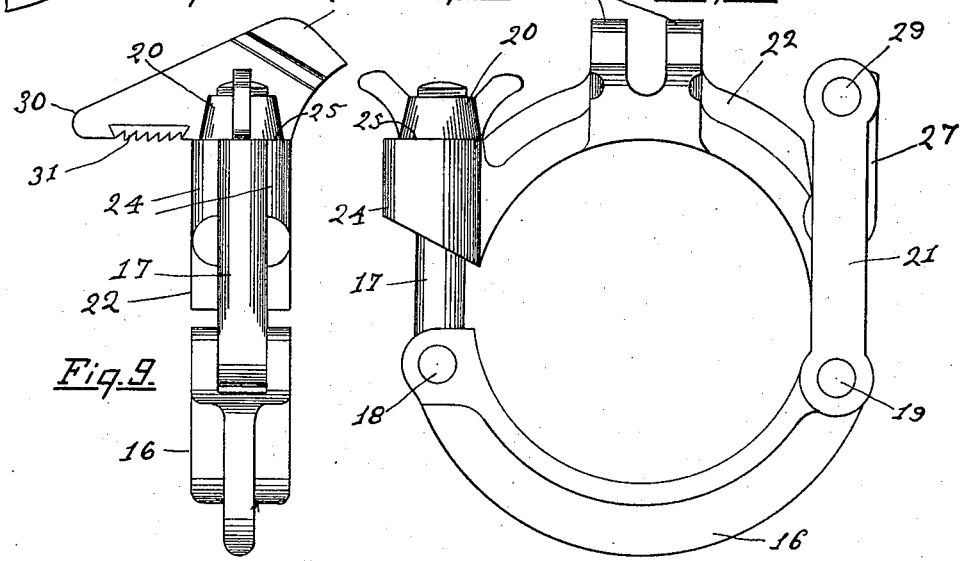

UNITED STATES PATENT OFFICE.

URBAN SHALER MORRIS, OF TULSA, OKLAHOMA.

PIPE-BENDING MECHANISM.

1,342,564.         Specification of Letters Patent.     Patented June 8, 1920.

Application filed November 12, 1917, Serial No. 201,636. Renewed November 12, 1919. Serial No. 337,630.

*To all whom it may concern:*

Be it known that I, URBAN SHALER MORRIS, a citizen of the United States, residing at Tulsa, in the county of Tulsa and State of Oklahoma, have invented certain new and useful Improvements in Pipe-Bending Mechanism, of which the following is a full, clear, and exact description, such as will enable others skilled in the art to which it appertains to make and use the same.

The invention relates to pipe bending mechanism and seeks to provide a simple and effective mechanism which can be mounted directly on the pipe of a pipe line while the pipe is in the process of being laid, and driven by the pipe laying machine, so that the pipe can be bent and fitted to the usual uneven ground in which it is laid and changes in the direction of the pipe line can be made at a very small expense.

In laying pipe lines for the transportation of oil, and for other purposes it is necessary, in order to avoid the needless expense of cutting through hills and raising the pipe above valleys, to bend the pipe to conform to the often descending and ascending surface of the ground in which the pipe is laid.

The direction of the pipe line often changes which requires bending the pipe to conform to the direction of the line. The bending of the pipe in laying pipe lines is very expensive owing to the fact that in the usual way it requires considerable time and during this time of bending the pipe, the laying of the pipe is suspended, necessitating the idleness of a force of men and the pipe laying machine, this idleness decreasing the capacity of the laying forces and machine and correspondingly increasing the cost of laying the pipe line. It is essential that a more expeditious method of bending the pipe be provided so that the expense will be greatly reduced.

The present invention seeks to provide an improved simple and efficient mechanism that can be quickly and easily applied to the pipe, together with connections to the pipe laying machine, so that the pipe can be expeditiously bent to the required shape by power supplied from the power driven pipe laying machine.

With these and other objects in view the invention consists in the features of construction combinations and arrangements of parts hereinafter set forth and more particularly pointed out in the appended claim, the accompanying drawings illustrating a form and application of the improved mechanism.

In the drawings:—

Fig. 2, is a plan view of the mechanism applied to a pipe, the connection to the pipe laying machine being broken away, and the application being for a horizontal bend of the pipe.

Fig. 3, is a view in elevation of the pipe bending mechanism applied to a pipe for a horizontal bend of the pipe.

Fig. 4 is an enlarged sectional view of the bending jack forming part of the mechanism and taken on line 3—3 of Fig. 3.

Fig. 5 is an enlarged view of the cable rest block fitting between the jack and the cable.

Fig. 6 is an enlarged view of the rest saddle fitting between the jack and the pipe.

Fig. 7 is an enlarged view of the pipe and cable connecting mechanism.

Fig. 8 is an enlarged view of the pipe and cable connecting mechanism viewed at an angle of ninety degrees from the view Fig. 7.

Fig. 9 is an enlarged view of the pipe and cable connecting mechanism taken from the opposite direction of the view Fig. 8.

Fig. 10 is a fragmentary enlarged view of the pipe and cable connecting mechanism with certain positions shown in dotted lines to illustrate the toggle grip of the connecting mechanism upon the pipe.

Figure 1:
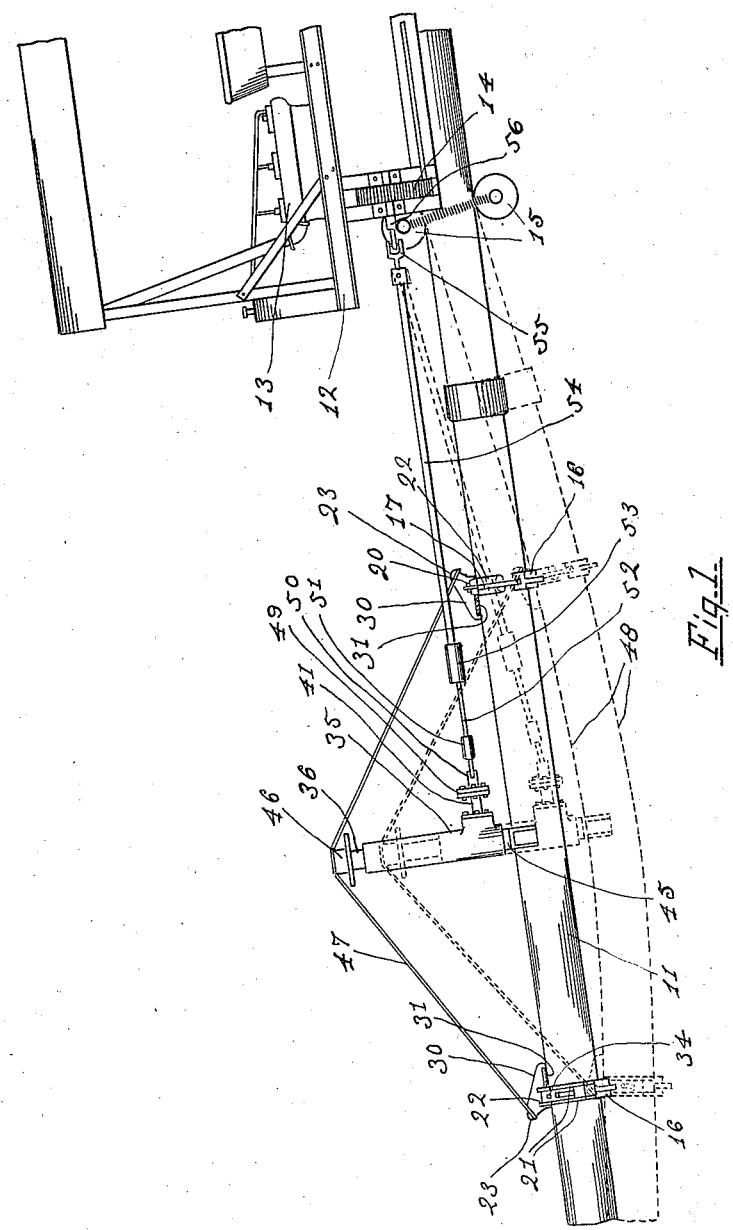
Figure 1, is a view in elevation of the improved mechanism applied to the pipe of a pipe line and showing the connection to the pipe laying machine, the pipe line and the pipe laying machine being shown in fragmentary view, the application being for a vertical bend of the pipe.

The pipe 11, pipe laying machine 12, engine 13, gear 14 and rolls 15 are of common and well known construction, it being understood that the pipe forms a track upon which the pipe laying machine travels, and that the machine screws each successive length of pipe to the last preceding length, and that the pipe line consists of a vast number of lengths of pipe screw threaded and connected, the rolls 15 forming one of the traversing bearings of the machine on the pipe and pipe line, the machine being shown only in fragmentary view to show the connection and operation of the pipe bending mechanism.

Spaced at a suitable distance upon the pipe 11 and in reverse positions are duplicate sets of cable connecting mechanism; each as illustrated comprising the lower gripping member 16 to which is pivoted by the pins 18 and 19 respectively the adjusting bolt 17 and the link bars 21. The upper gripping member 22 is provided with the jaws 23 for cable connection, the jaws 24 to form a rest 25 for the nut 20, and the lug shaped boss 26 to which the toggle link 27 is pivoted by the pin 28, the opposite end of the link 27 being pivoted to the link bars 21 by the pin 29.

From the upper gripping member 22 the projection 30 extends in an opposite direction from the jaws 23 and is provided with the inserted steel toothed gripping plate 31 to prevent slippage of the gripping mechanism upon the pipe.

It is understood that the gripping mechanism is constructed in sizes to conform to the pipe but that sufficient adjustment can be made by the nut 20 to accommodate two or more sizes of pipe.

The toggle link 27 is slotted at the upper end 32 thereof and the pin 29 is fixed in the link bars 21 so that by swinging the bolt 17 from between the jaws 24 the gripping members 16 and 22 are easily separated, and these members are usually placed on the pipe 11 separately, connecting the pin 29 by a swinging motion of the member 22, after which the bolt 17 is placed as shown in Fig. 7 and the nut 20 adjusted while the toggle link 27 and link bars 21 are in the outwardly leaning connected position shown in dotted lines 32ª of Fig. 10, the gripping of the mechanism being accomplished by throwing the toggle link to the position of dotted lines 33 of Fig. 10, it being obvious that when the latter has reached this position that the pin 29 has passed the position where the pins 29, 28 and 19 are in alinement and that the members 16 and 22 are locked in a tight grip upon the pipe 11. The toggle link can be operated in any ordinary manner, but the hole 34 is provided therein for the insertion of any ordinary tool which may be at hand as the common and well known pinch or crow bar.

It will be understood that the toggle link can be thrown to and fro as the nut 20 is adjusted by hand and the operator will know by the force required to throw the link to the position of dotted lines 33, when the nut 20 is sufficiently tight, the nut not being intended to be tightened while the toggle link is under tension from the grip upon the pipes.

The bending jack as illustrated comprises the outer casing 35 in which is mounted so as to slide freely, the plunger 36, the latter being internally threaded to receive the screw 37, and the screw having mounted rigidly thereon the beveled gear 38 and provided with the bearing 39 and the thrust bearing 40. The shaft 41 is journaled in the outer casing 35 and has rigidly mounted thereon the beveled pinion 42 meshing with the gear 38, the thrust bearing 42ª being provided to prevent the pinion from backing out of mesh with the gear and to reduce the friction caused by the natural tendency of beveled gears to spread apart while in operation. The casing 35 is provided with the cavity 43, and the plunger with the cavity 44, these cavities being duplicate and for the purpose of receiving the pipe rest saddle 45 and the cable rest block 46, it being understood that either end of the jack can be placed next to the pipe or next to the cable 47. In the application as shown, however, the casing 35 is next to the pipe and the plunger 36 is next to the cable, the casing resting on the saddle 45 and the saddle on the pipe, while the rest block 46 rests on the plunger 36 and the cable upon the rest block, the ends of the cable connecting to the cable jaws 23 of the gripping mechanism.

It will be understood from the foregoing that owing to the positions of the gripping mechanism and the bending jack, and the angle of the cable 47 that when the shaft 41 is rotated in the direction that will force the plunger 36 outwardly from the casing 35 that the pipe 11 will bend in the direction from the jack as indicated by the dotted lines 48 of Fig. 1, and that this shaft can be rotated in any usual manner, it being preferred however to drive the shaft from the pipe laying machine in order to expedite the work.

When the bending jack exerts force upon the cable the tendency is to pull the gripping mechanism toward the jack, but owing to the cable connecting to the mechanism on the side thereof containing the toothed plates 31, any movement of the mechanism causes the members 22 to lean toward each other and thrust the teeth of the tooth plate into the pipe thus preventing further slippage of the mechanism.

To the shaft 41 is connected by the coupling 49 the shaft 50, the latter connecting to the common universal joint 51 to which in turn connects the square slip shaft 52, the square shaft fitting loosely in the internally squared socket 53 of the hollow shaft 54. The shaft 54 connects to the common universal joint 55 to which is connected the shaft 56, the latter in turn connecting to the gear wheel 14 driven from the engine 13 of the pipe laying machine 12, it being understood that the connections from the bending jack to the gear are suitable for driving the bending mechanism from the particular type of pipe laying machine illustrated and that changes can be made therein without departure from the invention.

In Fig. 1 the pipe bending mechanism is applied to the pipe with the bending jack projecting upward for a downward bend, while in Figs. 2 and 3 the bending jack projects horizontally for a horizontal bend, it being understood that owing to the flexible driving connections from the pipe laying machine to the bending mechanism that the jack can be applied to project in any direction from the pipe and that the pipe can be bent upward, downward, horizontally and at any intervening angle.

It will be understood that the bending mechanism can be applied and the pipe bent in the desired direction and to the desired degree and the mechanism removed in a very short space of time, and that a great saving is effected in the laying of an ordinary pipe line.

It is obvious that numerous changes may be made in the details as set forth without departure from the invention.

What I claim as new, and desire to secure by Letters Patent, is:—

In pipe bending mechanism, a pipe connecting member comprising a split collar arranged to encircle a pipe, an adjustable disconnectable hinge bolt connecting one side of said collar, link connections connecting the opposite side of said collar and arranged to grip the two halves of said collar tight upon the pipe, a cable connecting lug on one half of said collar, and a toothed member rigid with said cable lug and the corresponding half of said collar and arranged with the teeth thereof facing the axis of said collar to prevent slippage of said collar on a pipe.

URBAN SHALER MORRIS.